(No Model.)
T. H. BELL.
COMBINED PAPER CUTTER, PENCIL SHARPENER, AND ERASER.
No. 459,191. Patented Sept. 8, 1891.
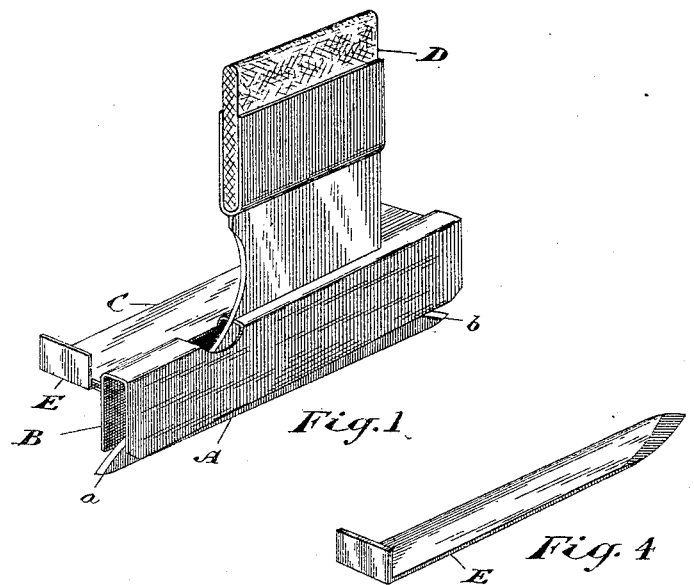
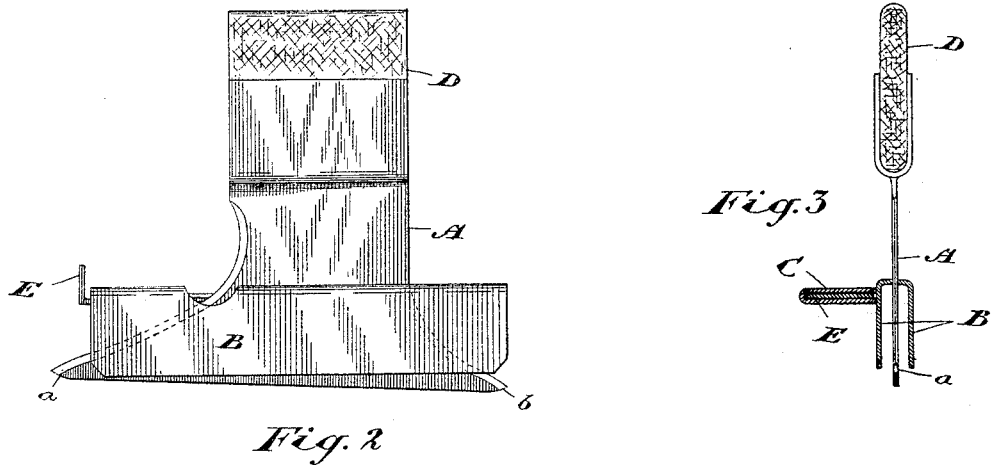
Witnesses.
F. R. Cameron,
N. G. McMillan
Inventor.
Thomas H. Bell
by Donald C. Ridout & Co.
Attys.

UNITED STATES PATENT OFFICE.

THOMAS H. BELL, OF BRAMPTON, CANADA.

COMBINED PAPER-CUTTER, PENCIL-SHARPENER, AND ERASER.

SPECIFICATION forming part of Letters Patent No. 459,191, dated September 8, 1891.

Application filed September 6, 1890. Serial No. 364,145. (No model.)

*To all whom it may concern:*

Be it known that I, THOMAS HAGYARD BELL, carpenter, of the town of Brampton, in the county of Peel, in the Province of Ontario, Canada, have invented a certain new and useful Combined Paper-Cutter, Pencil-Sharpener, and Eraser, of which the following is a specification.

The object of the invention is to combine in a single device a paper-cutter, pencil-sharpener, and eraser; and it consists, essentially, of a double-ended knife suspended between two jaws, from which a casing extends substantially at right angles, and designed to contain a removable ink-eraser, the shank of the knife extending above the casing and formed to receive a piece of erasing-rubber, all as hereinafter described, and then definitely claimed.

Figure 1 is a perspective view of the device embraced by my invention. Fig. 2 is a side elevation of the same. Fig. 3 is a cross-section through $x\ y$. Fig. 4 is a detail of the removable eraser.

A represents a double-ended knife-blade suspended between the jaws B, at right angles to which a casing C extends. The shank of the knife-blade A extends above the jaws B and casing C, and is shaped, as shown, to receive and hold the erasing-rubber D.

E is an erasing-knife, which, when not required for use, is slipped into the casing C, as indicated in Fig. 1.

In order to separate two leaves of a book, the point $a$ of the knife-blade A is inserted between the two leaves to be separated, the said leaves being inserted between the jaws B, one leaf on each side of the knife-blade A.

The knife-blade is then pushed forward, the casing C resting on the other leaves acting as a guide for the cutting-knife. The other point $b$ of the knife-blade A is intended to cut wrappers from newspapers by passing said point between the wrapper and the newspaper, the casing preventing the point entering deep enough to cut the newspaper.

The invention itself is so simple and is so clearly illustrated in the accompanying drawings that it is not necessary to enter into a lengthy description of its construction and operation.

What I claim as my invention is—

1. A two-pointed knife-blade A, suspended between the two jaws B, the points $a$ and $b$ of the said knife projecting at different depths below the said jaws, substantially as and for the purpose specified.

2. A knife-blade A, suspended between the two jaws B and having a shank extending above the said jaws and formed to receive and hold the erasing-rubber D, substantially as and for the purpose specified.

3. A knife-blade A, suspended between the two jaws B, the points $a$ and $b$ of the said knife projecting below the said jaw, and a casing C, extending at right angles to the jaws B and formed to receive the erasing-knife E, the shank of the knife-blade A being formed to receive and hold the erasing-rubber D, substantially as and for the purpose specified.

Brampton, August 6, 1890.

THOS. H. BELL.

In presence of—
THOMAS H. SHARP,
THOMAS DOWELL.